Aug. 13, 1968  B. KIRSCH  3,396,785
HEATING UNITS
Filed May 20, 1965  9 Sheets—Sheet 1
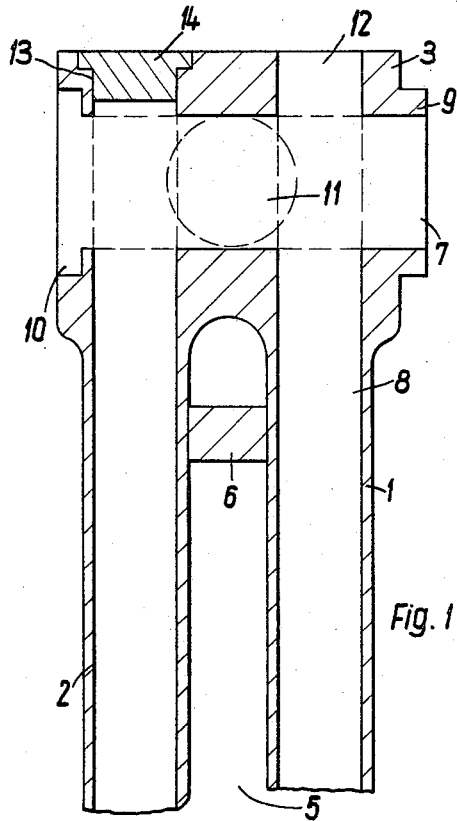
Fig. 1
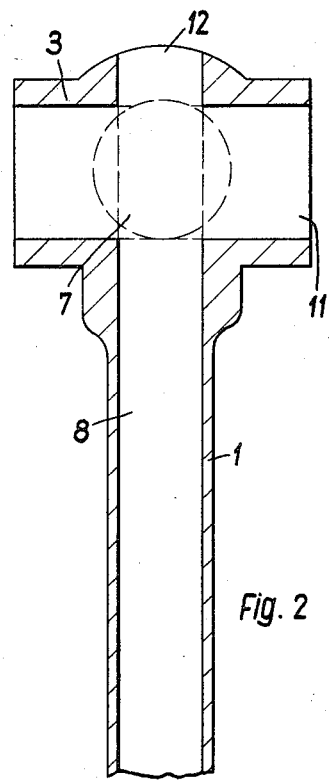
Fig. 2
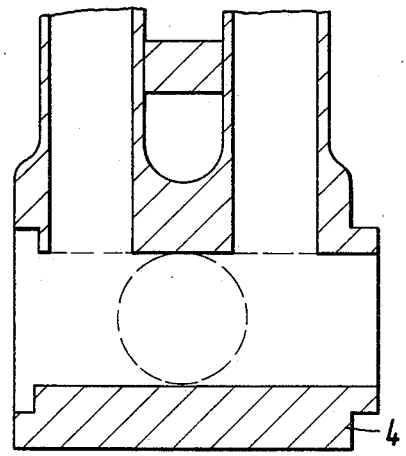
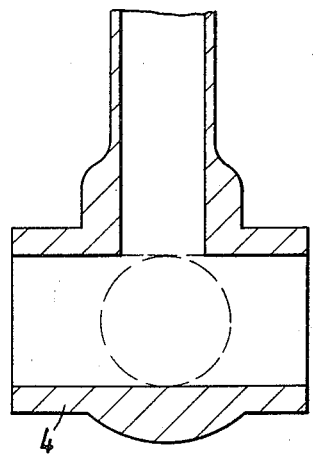
Inventor:
BERNHARD KIRSCH
By Robert W. Beach
ATTORNEY Aug. 13, 1968  B. KIRSCH  3,396,785
HEATING UNITS
Filed May 20, 1965  9 Sheets-Sheet 2
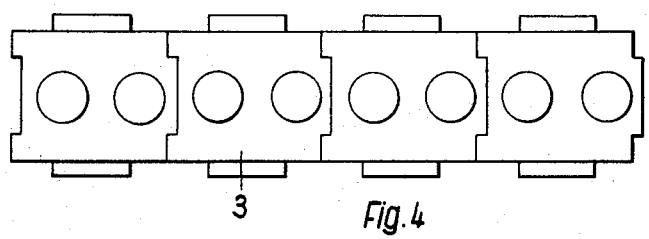
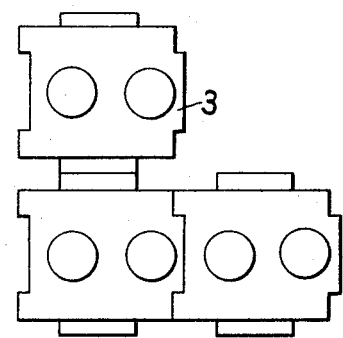
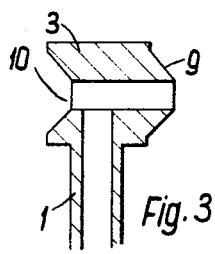
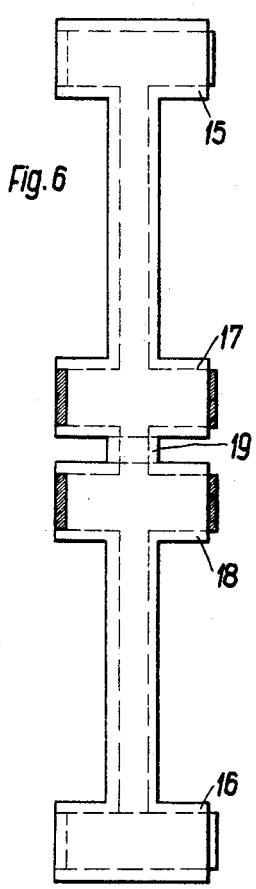
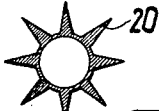
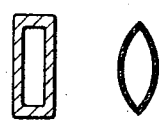
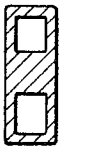
INVENTOR.
BERNHARD KIRSCH
BY
Robert W. Beach
ATTORNEY Aug. 13, 1968  B. KIRSCH  3,396,785
HEATING UNITS
Filed May 20, 1965  9 Sheets-Sheet 3
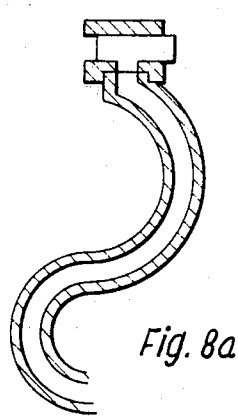
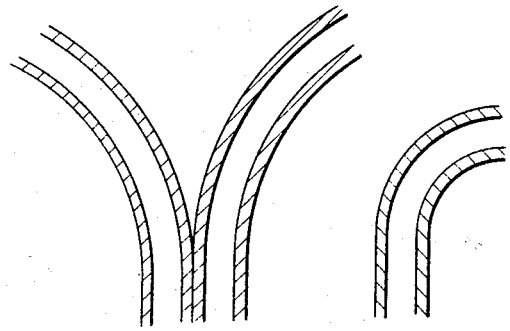
Fig. 8a  Fig. 8b  Fig. 8c
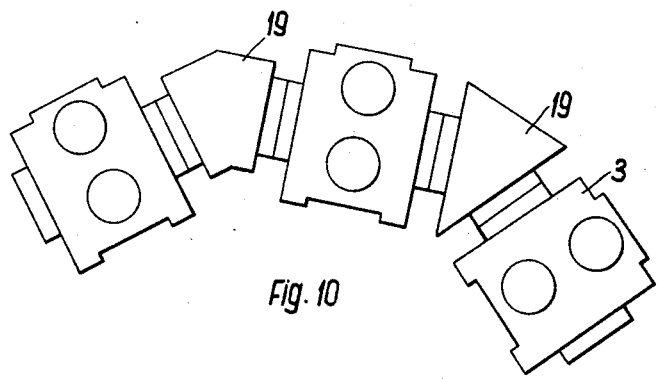
Fig. 10
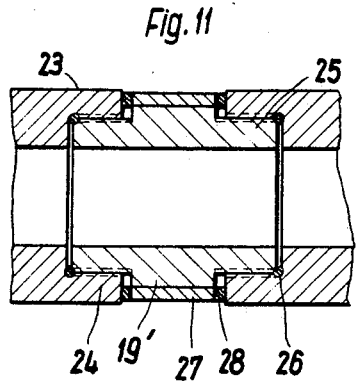
Fig. 11
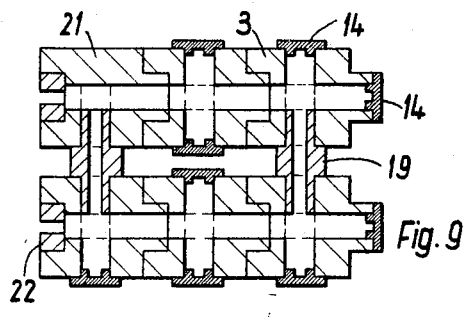
Fig. 9
INVENTOR.
BERNHARD KIRSCH
BY
Robert W. Beach
ATTORNEY

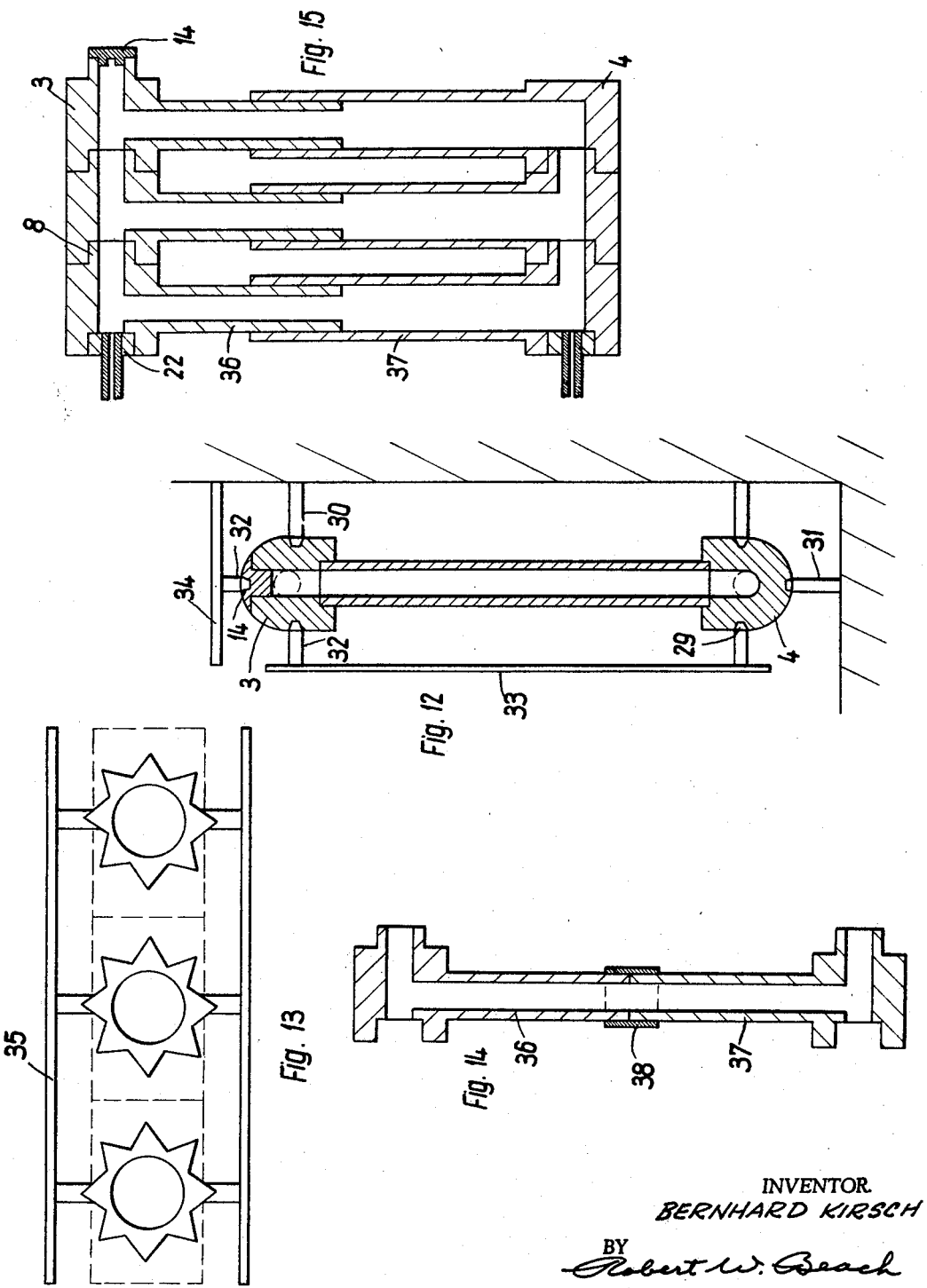

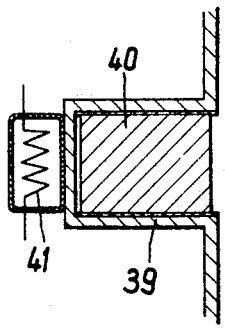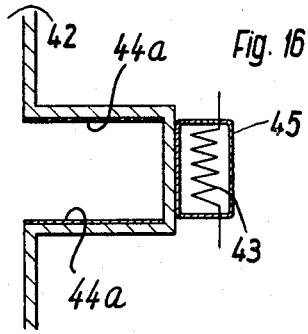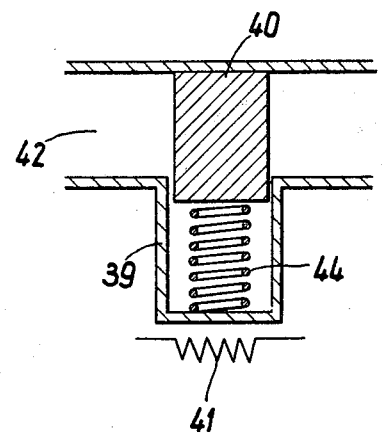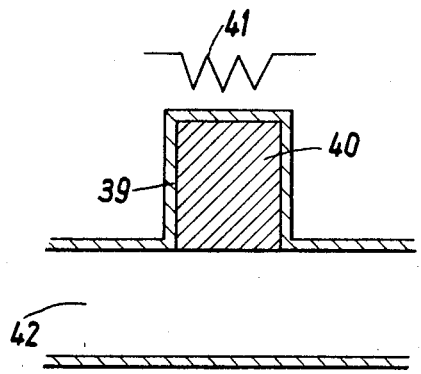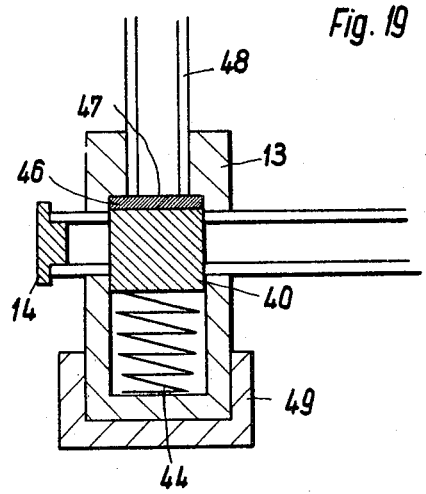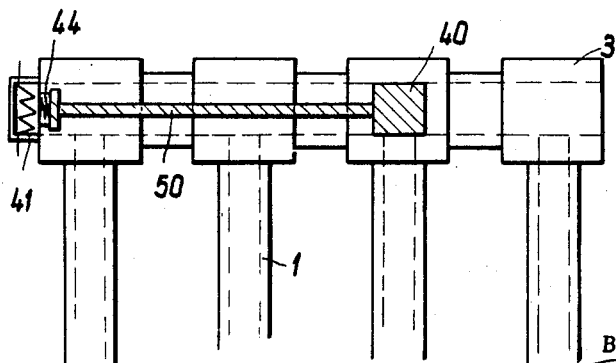

Aug. 13, 1968   B. KIRSCH   3,396,785
HEATING UNITS

Filed May 20, 1965   9 Sheets-Sheet 7

INVENTOR.
BERNHARD KIRSCH
BY
Robert W. Beach
ATTORNEY

Inventor:

Aug. 13, 1968  B. KIRSCH  3,396,785
HEATING UNITS

Filed May 20, 1965  9 Sheets-Sheet 9

INVENTOR.
BERNHARD KIRSCH
BY
Robert W. Beach
ATTORNEY

United States Patent Office 3,396,785
Patented Aug. 13, 1968

3,396,785
HEATING UNITS
Bernhard Kirsch, Biewerer Str. 193,
Trier-Biewer, Germany
Filed May 20, 1965, Ser. No. 457,324
Claims priority, application Germany, May 22, 1964,
K 53,006
3 Claims. (Cl. 165—175)

ABSTRACT OF THE DISCLOSURE

Various heating units in selected sizes and configurations can be assembled by combining a number of identical heating components in different arrangements. Each component has an upper header and a lower header connected by two elongated, parallel spaced tubes. Each header has at least one passage extending through it transversely of the tubes and communicating with the tubes for circulation of heating fluid. Each header may have additional passages extending transversely of the tubes and intersecting the first passage and may also have a pair of passages in alignment with the tubes so that the heating components can be connected side-by-side, front-to-back, end-to-end or at an acute angle to form a heating unit adaptable to various wall contours. Each heating component is made of unitary moulded plastic construction without seams.

---

Known radiators frequently consist of steel plate in which two parts are welded together, the internal surfaces of which are generally comparatively rough and uneven, which offer a considerable resistance to the flow of water or other heating fluid and, therefore, reduce circulation efficiency. Moreover the annular welded seams produce protuberances upon which deposits of rust form in a short time. In cast radiators the casting process results in high production costs and the surfaces are rough. As experience has shown, such radiators are easily damaged, such as by the formation of cracks during shipment, by freezing or by external mechanical injuries since conventional cast radiators are sensitive to shock. Moreover, they are comparatively heavy and all joints are threaded, which makes the operation of assembling complicated.

When assembled, the radiator components are always closely juxtaposed so that spatial arrangement in a heating installation is relatively inflexible. Consequently, numerous types of heating units which vary in size, and, therefore, heat output, must be used.

A further disadvantage is that all parts of known heating units must be primed and then painted, which is expensive and complicated, and usually requires that the units be removed from the system. Moreover, the heat output decreases wih each coat of paint.

It is an object of the invention to eliminate these and other disadvantages. Further objects and advantages of the construction of the present invention will become apparent from the following description.

The heating unit of the present invention comprises a plurality of heating components adapted ot be assembled together, wherein each component is of moulded construction and includes a hollow body having a smooth, seamless internal wall over which the heating fluid is to flow and has a hollow header at each end of the body. The headers include passages transversely of the body length connecting with such hollow bodies and with adjacent heating components.

The possible combinations which can be made by utilizing a plurality of components for one heating unit are considerably increased by providing in each component header two or more intersecting passage. Two heating members may thereby, as in previous constructions, be closely juxtaposed, or may be spaced from an adjacent component by a spacing connector having a passage therethrough for flow of heating fluid.

It has been proven to be particularly advantageous to provide on the external surface of the connecting heads recesses and/or cam-shaped lugs for receiving connection pieces, spacers, air-deflecting surfaces, frames or the like and/or lugs, screws, keys or the like for securing the heating unit to supporting elements. Similarly, plugs which may be inserted into unused openings in the headers may have cavities or projections, for example, for attaching connecting pieces, spacers, deflectors, frames or the like.

According to one embodiment of the present invention, the heating component may be formed by inserting seamless heating tubes of any desired length into preformed headers, or each heating component may have similar interconnectible upper and lower sections wherein each section has a body tube with a header on one of its ends and the other free end is connected to the cooperating section by a sleeve or the like, or the free end of one section may telescopically slide into another. By means of an embodiment of this type, it is possible to adapt the heating members to the actual spatial conditions, such flexibility affording a great advantage.

It has furthermore been proven advantageous to provide suitable solenoid valves in selected headers.

The wall of the seamless heating component is formed of plastic material reinforced with fibers, mat or woven material and which may contain metallic powder such as aluminum or the like to increase heat conductivity. The tubular conduits for conveying the heating fluid are preferably also made of plastic material and are secured in the connecting head by cementing, welding, threading or the like. Furthermore, it has been found advantageous to provide the internal wall of the heating components with a gas- and/or water-impermeable, corrosion resistant, sealing lining which will withstand high temperatures and pressures of heating fluid flowing therethrough. According to another embodiment, the seamless, internally smooth heating components are screwed to one or more tubes conveying and/or containing heating fluid, and each is individually secured and sealed to such tube or tubes.

In order that the invention may be more clearly understood, reference will now be made to the accompanying drawings in which alternate forms thereof are shown by way of example.

FIGURE 1 is a longitudinal section through one form of heating component of the present invention.

FIGURE 2 is a longitudinal section through the component of FIGURE 1 taken perpendicular to that figure.

FIGURE 3 is a section through a portion of a heating component showing an alternate form of connecting means.

FIGURE 4 is a plan showing a plurality of heating components combined in juxtaposed series and FIGURE 5 is a plan showing such heating members combined in spaced relationship.

FIGURE 6 is an elevation showing two heating components in superposed end-to-end relationship.

FIGURES 7a, 7b, 7c, 7d, 7e and 7f are transverse sections through the hollow bodies of heating components illustrating alternate configurations for such bodies.

FIGURES 8a, 8b and 8c are longitudinal sections through heating component bodies illustrating alternative configurations thereof.

FIGURE 9 is a horizontal section through a composite heating unit constructed of a plurality of heating components.

FIGURE 10 is a plan illustrating another combination of a plurality of heating components.

FIGURE 11 is a longitudinal section through a spacing connector joining two heating components.

FIGURE 12 is a longitudinal section through a heating unit having spacers, foot supports and deflectors.

FIGURE 13 is a diagrammatic section through heating components having increased radiating surfaces and having deflectors.

FIGURE 14 is a longitudinal section through a heating member having similar upper and lower sections and a connecting sleeve.

FIGURE 15 is a longitudinal section through a plurality of heating members having upper and lower telescoping sections.

FIGURE 16 is a section through a valve having two solenoids.

FIGURE 17 is a section through a valve having a spring-pressed valve body and opposing solenoid.

FIGURE 18 is a section through a different solenoid valve.

FIGURE 19 is a section through a valve in a tube joint.

FIGURE 20 is a plan of a heating unit showing an alternate valve installation, parts being in section.

Figure 22:
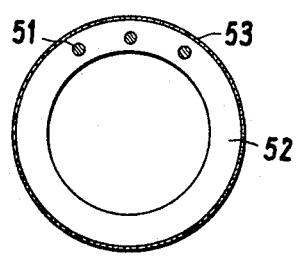
FIGURE 22 is a transverse section through a tubular conduit having electrical wires embedded in the wall thereof.

Heating components for a composite heating unit of the invention are in the form of interconnectable, unitary moulded bodies, an example of which is shown in FIGURES 1 and 2. Each member consists of one or more hollow elements in the form of heating tubes 1 and 2, which have upper and lower headers 3 and 4, respectively. A space 5 is formed between the two tubes through which air passes receiving heat from the radiator. For increased stability, the tubes may be connected by braces 6.

Each header has a passage 7 extending transversely of the lengths of the heating tubes, which passage is connected to the passages 8 of the heating tubes. To assemble a plurality of such heating components to form a radiator, an annular flange forming a boss 9 is located on one end of passage 7 and a corresponding recess 10 is located on the other end of such passage. The internal wall of the recess and the external wall of the boss are cylindrical in the form shown in FIGURES 1 and 2, but such boss and recess may alternatively be frustoconical as shown in FIGURE 3 or may be of spherical or other configuration.

Since it may be advantageous in certain circumstances to arrange a plurality of heating components not only in side-by-side relationship, but also in front-to-back relationship, as shown for example in FIGURE 5, a passage 11, shown in FIGURES 1 and 2, transversely of passage 7 may be provided in the heater. Also, headers of arcuate or angle shape may be combined into various configurations.

FIGURE 10 illustrates a plurality of heating components interconnected by spacing members or separators which are of different shapes, so that the heating members may be arranged, for example, along a semi-circular path.

Furthermore, openings 12 and 13 shown in FIGURE 1 may be provided in the header 3 coaxial with the heating tubes, which openings may be closed by plugs 14. Through these openings may be removed the mould cores used in forming the heating tubes during the production of the heating component by casting or pressing. It is, of course, also possible to provide such openings in the lower header 4. However, the openings 12 and 13 may also be used for connecting two heating components in superposed end-to-end relationship, as shown in FIGURE 6. In this case, the outer headers 15 and 16 are connected to conduits for circulating the heating fluid and the inner headers 17 and 18 are plugged and contribute to an increase in rigidity of the unit. A spacing connector 19 connects the heating components.

The heating tubes may be of any desired shape in cross section, such as circular, oval, star-shaped or polygonal. It is, of course, recognized that a larger external surface area provides more efficient radiation of heat. FIGURES 7a to 7f show a few examples of possible cross-sectional shapes. FIGURE 7a shows a heating fluid passage of circular cross section having radiating fins 20. In FIGURE 7b, the member has a star-shaped cross section; in FIGURE 7c the cross section is rectangular; in FIGURE 7d the cross section is lenticular. In addition to these examples of single-compartmented tubes, it is also possible, as shown, for example, in FIGURES 7e and 7f, to provide plural-passage hollow members. Moreover, the heating members may be curved longitudinally according to artistic taste or for practical purposes, such as to adapt to a particular wall configuration. FIGURE 8a shows, for example, a reverse curve, FIGURE 8b a bifurcated configuration, and FIGURE 8c a quarter bend.

FIGURE 9 shows a plurality of heating components which are assembled to form a heating unit, the heating components being arranged both in series and in side-by-side relationship to form a block. As may be seen from this example, it is not only possible to arrange the heating components close together, but alternatively to connect them in adjacent, spaced relationship by a spacing connector 19. The openings which are not used for fluid flow are closed by plugs 14 which may be inserted by press-fitting, screwing, cementing, or welding, or may be inserted before the moulded heating components have cooled to provide a shrink fit. Alternatively, some connecting heads in a heating unit may be formed in which the transverse passages are blind passages connected with, but not extending beyond, a heating tube, as shown in the heating component 21 at the top left of FIGURE 9.

Figure 27:
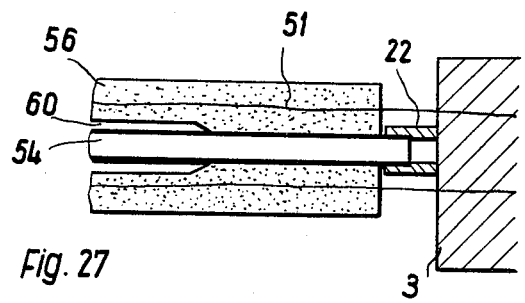
FIGURE 27 is a longitudinal section through a connection of a tubular conduit to the header of a heating component.

Heating members according to the invention may be connected conventionally by being threaded to a feed pipe. However, it has been found to be particularly desirable to use flexible pipes made of plastic material, which pipes may be bent without special tools to fit into corners, for example. Similarly, it is possible simply to bond such plastic tubes or pipes into connecting parts of the heating components, or the pipes may be connected by a socket or bushing 22 as shown in FIGURES 9, 15 and 27. Furthermore, apart from facilitating assembly, the use of a flexible plastic tube has the great advantage that its end can be pinched or clamped to prevent flow of heating fluid therethrough when the heating components are removed so that the fluid need not be drained from the entire heating system as is required in conventional installations. This considerably simplifies repairs or replacement of individual heating members.

As has been mentioned, two heating components may be connected together by a spacing connector 19 of any desired length. FIGURE 11 shows a connector 19' between two heating components, the connecting ends 23 of the headers being provided with internal threads 24. The nipple 19' has reduced ends 25 with corresponding external threads. Sealing rings 26 prevent the heating fluid flowing through the passages from penetrating into the threaded connections. The periphery of the nipple is preferably shaped, such as polygonally, so that it may be turned by a suitably shaped tool, such as a wrench.

A spacer sleeve 27, which is axially movable and which can also have sealing rings 28 on its end surfaces, is assembled around the nipple. Such sleeve abuts the ends of the adjacent heating components so that, if one end 25 of the connector reaches the end of the thread of one heating component, the distance which the opposite end 25 is threaded into another heating component is limited by sleeve 27 to establish the desired spacing between such heating components. Manufacturing inaccuracies in thread length are compensated thereby.

Recesses 29 and/or projections may be provided on the outer surfaces of the headers, as shown in FIGURE 12, to receive spacers 30, feet 31, or brackets 32 for deflectors 33 or cover plates 34. Such deflectors and cover plates direct the flow of air being heated to produce convection currents and improve the portability by enabling the several components to be demounted easily. Alternatively, lugs, grooves, keys or the like may be provided for connecting to supporting elements. It is also possible to provide recesses, projections or fasteners in or on the plugs 14 to secure sockets, spacers, deflectors, frames or the like.

FIGURE 13 shows a unit having a plurality of heating components, in which the heating tube walls provide radiating surfaces of greater area, and deflectors 35.

It may be advantageous to manufacture unitary headers separately and then to insert heating tubes of any desired length into corresponding couplings on or sockets in the headers, such as shown, for example, in FIGURE 12. FIGURE 14 shows a form wherein the upper and lower sections 36 and 37 of the heating components are of similar construction. This reduces the cost of production and simplifies storage. Such sections may be connected by cementing. Alternatively, the connection may be effected or reinforced by a sleeve 38, as shown in FIGURE 14, or by a band or the like which encircles the joint connecting the sections of the heating component and bonded to such components.

According to the embodiment shown in FIGURE 15, upper tubular sections 36 may be inserted into lower tubular sections 37 and the height of the heating members may be reduced or extended as required by a telescoping action. Since the heating components are advantageously made from water-and-heat-resistant plastic material, both sections may be simply bonded in situ when the desired height has been selected.

Moreover, due to the nesting relationship of one tube within another, the composite upright heating tubes have stepped internal cross sections. Naturally, it is also possible to provide such a varying cross section with unitary members, by forming the internal wall with stepped or tapering portions.

Heating components formed in complemental sections with an open end have the advantage that they can be manufactured more easily since the mould cores can be removed directly. Moreover, the desired length can be obtained by cutting the heating tube or facing its end to size.

Heating components according to the invention may have a manually- or automatically-operated solenoid valve built into the header. In known heating systems, the flow of heating fluid may be regulated by manually-operated valves in the heating component. The temperature is automatically regulated, generally from a central control point, by means of a main valve. If individual rooms are to be kept warm, but others only temporarily above freezing, as is the case, for example, in a system for heating both a dwelling place and an office, it is desirable to provide means for selectively cutting off individual radiators, or cutting down the amount of heat produced by selected heating units, while permitting full heat capacity to be produced by other heating units in the system. Thus, individual valves must be operated daily; otherwise it is necessary to install a multi-circuit arrangement. In order to control the heating system more efficiently, the valves provided in the heating components of the present invention are electrically actuatable to control selected heating units, as desired. In this way it becomes possible to operate the valves by remote control and/or by means of room thermostats for each individual heat transmission location. With apparatus of this type, it is also possible, for example, to turn off completely, or to turn down, the heat when leaving a room by operating a switch, or to regulate each room individually by means of room thermostats.

FIGURES 16 to 20 show examples of a regulating valve of this type. In these arrangements, sliding valve bodies 40 or other suitable magnetizable members are movably arranged in a closed housing 39 of nonmagnetic material, which may be formed by header 3. The valve body 40 cooperates with at least one energizing coil 41 in such a way that the valve body can cut off or restrict the flow of heating fluid through the passage 42, as required.

According to the embodiment of FIGURE 16, energization of the left coil 41 moves magnetizable valve body 40 from right to left, while the right coil 43 moves it from left to right. When both coils are energized simultaneously, valve body 40 will be held in a central, passage-closing portion. The coils 41 and 43 may, however, be so wired as to regulate the slide by moving it by pulses of current; then, if and when the flow of current is broken, the valve slide resumes its original position. In this arrangement the current consumption is negligible and the coils can be quite small.

According to the embodiment of FIGURE 17, a spring 44 urges the slidable valve body 40 upward into the passage 42, while energization of the coil 41 retracts the valve body downward from the passage and thereby opens the valve.

According to the embodiment of FIGURE 18, energization of the coil 41 normally draws the valve body 40 upward and, when the coil is deenergized, the valve body is moved downward by gravity to close the valve.

The valve body is advantageously guided for movement within the housing 39 by means of grooves 44a or the like formed in the housing wall engaging ribs on the valve body, as shown in FIGURE 16. The coils 41 or 43 are embedded in waterproof resin, or the like, indicated at 45.

According to the embodiment of FIGURE 19, the valve is provided in the header of a heating component which is connected to the supply pipe so that it regulates the actual supply of the heating fluid, the joint for the supply being locatable to the rear of the heating member and out of sight. In this embodiment, the slidable valve body 40 has a sealing disk 46 which is urged by spring 44 against the valve seat formed by the end of the tubular conduit 48 to close the fluid supply opening 47. An electromagnet 49 retracts the valve body when the energizing current is switched on.

FIGURE 20 shows another embodiment in which the slidable valve body 40 is mounted on a rod 50, which passes through a plurality of heating members. The heating members in each unit can thereby be divided into two different flow circuits.

The leads for the electrical circuits for energizing the coils 41 may be embedded in or mounted on the wall of the valve housing or the header and the walls of the tubular conduits when the component is made. In FIGURE 22 three conducting wires 51 are shown as being embedded in the wall 52 of the tubular conduit. Such tube is made of nonmetallic material and is surrounded by a covering layer 53 to increase its rigidity.

Figure 23:
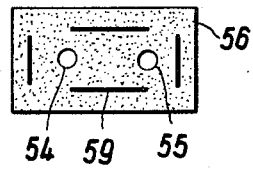
FIGURES 23 through 26 are transverse sections through tubular conduits embedded in alternate forms of reinforcing jackets.
Figure 21:
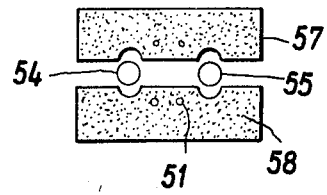
FIGURE 21 is an end elevation of tubular conduits within a jacket, parts being shown in exploded relationship.
Figure 24:
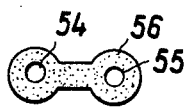
Figure 25:
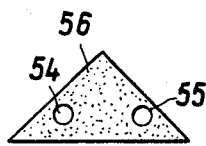
Figure 26:
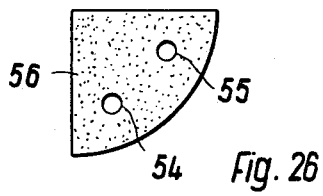

For improved heat insulation, drain and feed pipes 54 and 55 may be enclosed within jackets 56 made of heat-insulating material, for example, foamed plastic material, as is clearly shown in FIGURES 21 and 23 to 26. The jacket may advantageously consist of two similar body portions 57 and 58 which have preformed grooves or channels to receive pipes for prefabricated assembly as shown in FIGURE 21. It is also possible for the electrical conductors 51 to be embedded in the jacket, as shown in FIGURE 21, instead of in the wall of the tube as shown in FIGURE 22. Inserts 59 shown in FIGURE 23 are provided for reinforcing purposes. With the aid of a jacket of this type, it is easier for the tubular conduit to be shifted. The foam jackets may be bonded directly to a room ceiling or wall, or other support.

There may be clearance in the jackets to allow for expansion of the pipe when warm. Such expansion clearances 60 are shown between pipe 54 and jacket 56 in FIGURE 27.

Of course, aluminum or copper pipes may, for example, be used instead of plastic. However, in such instances, it is desirable to provide a plastic nipple as a connector to the heating component. Plastic-coated metal tubes may also be used, the plastic covering then being bonded for connecting purposes.

As has been mentioned above, it has been found particularly advantageous to manufacture plastic heating members according to the invention with or without a lining. However, as thorough experiments have shown, there is the possibility when plastic material is used for the production of heating members, particularly when it is of the self-hardening type, that the heating fluid, for example water, at high temperature and pressure may be forced through pores or hairline cracks which are normally closed by pressure or action of heat but which may open up. Therefore, it is desirable to apply a thin sealing layer of water- and/or gas-impermeable, corrosion-resistant material to the internal wall of the heating components or the tubular conduits. This sealing layer, which may, for example, be of plastic material or the like, or alternatively, of metal, may be sprayed, evaporated, sintered, or galvanically or elastrostatically applied before, during or after the formation of the heating component. Such a sealing lining may also be used in heating members made of metal, for example in cast members, so as to render the inner surface smooth.

It has been proved particularly successful to manufacture the heating components from fiber-glass-reinforced plastic material, into which metallic powder, filaments or foil of aluminum, copper and/or other materials may be introduced for increasing the heat conductivity.

Figure 28A:
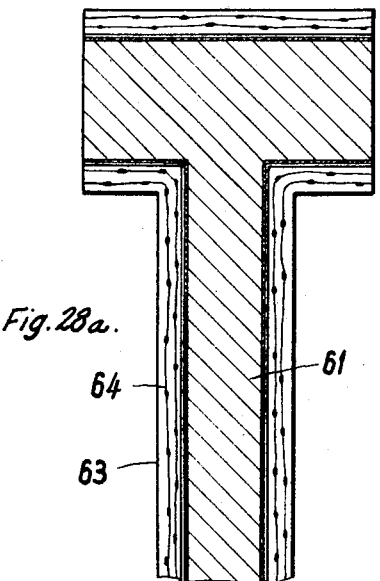
FIGURE 28a is a longitudinal section through a portion of a heating component and mould core and FIGURE 28b is a longitudinal section through a portion of a heating component with the mould core removed.

The heating components may be simply produced by a self-hardening process, by spraying or painting a thin sealing layer 62, as shown in FIGURE 28a, on a mould core 61 which core, for example, may consist of stearin, metal having a low melting point, or the like. The layer 62 could also be formed by immersing the core in a bath of appropriate material.

Figure 28B:
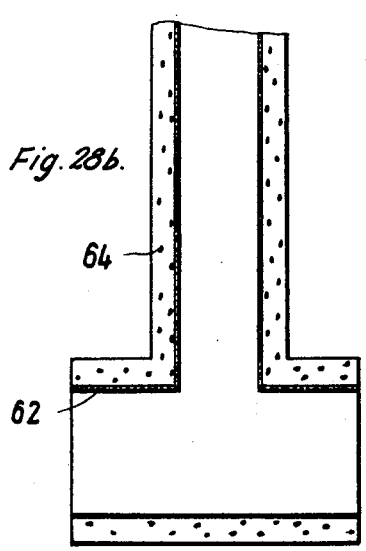

Fiber-reinforced plastic material 63 is applied to the core 61, intermediate layers 64 made of aluminum or other heat-conducting material being included if desired. During the subsequentl pressing and hardening, the metal sealing layer 62 applied directly on the mould core is pressed into the inner layer of plastic material and is bonded to such material. Such layer remains on the internal wall of the hollow body even after the core is withdrawn. While in FIGURE 28a a section of a heating component is shown with the core 61 still in position, in FIGURE 28b the heating component is shown after hardening of the component and melting out of the core. Due to the sealing layer 62 on the internal wall of the heating component such wall is quite smooth. Penetration of heating fluid into the wall is consequently prevented, even if the fluid is under high pressure.

The use of mould cores made of material having a low melting point has the advantage that after the hollow component has hardened, the cores can be melted out by heating, similar to the lost-wax process. In this case, no special mould openings are necessary in the heating members. The molten core material may be collected so that it may be used again for a similar purpose. Similarly, wire helices may be used as cores, which can easily be withdrawn after the hollow bodies have become hardened. Inflatable bladders may also be used as moulds. Further it is possible to apply magnetic plastic material electrostatically.

If it is desired to manufacture heating components for experimental or testing purposes, transparent material may be used instead of coloured plastic material, in order, for example, to be able to follow the flow of the heating fluid.

Figure 30:
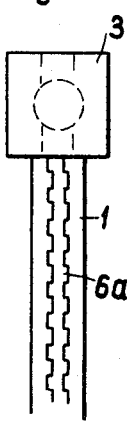
FIGURE 30 is a section along line A—A of FIGURE 29.
Figure 29:
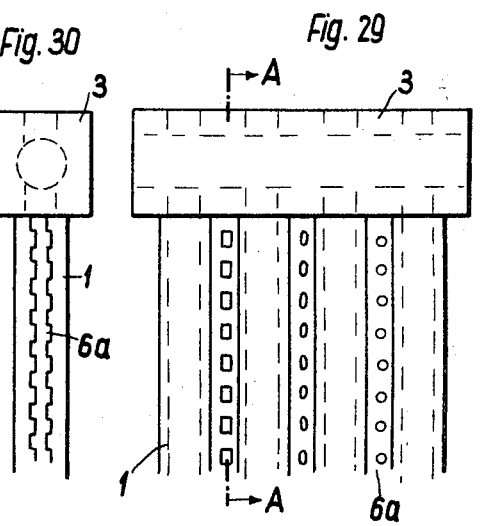
FIGURE 29 is an elevation of a portion of a heating component having a plurality of heating fluid passages.

In the plastic component according to FIGURES 29 and 30, the connecting webs 6a between the tubes 1 are reinforced. The fibers of the inserted material are pressed, incorporated or engaged together, as the projections and recesses show. In this type of construction, the header 3 is rectangular.

Further embodiments of heating elements according to the present invention are shown in FIGURES 31 to 34. A plurality of heating components comprising headers 3 and heating tubes 1 are mounted on a continuous connecting tube 65, which is constructed as a tubular support. The distance between the individual heating components may be selected as desired. Therefore, it is, for example, quite possible to space the heating components to correspond to the bays of a window. Additional radiating ribs or fins 66 shown in FIGURE 31 may be mounted directly on the tubular support 65 between the heating components, which fins may be in the form of rings or helices. Such ribs also strengthen and reinforce the tubular support. Water evaporation dishes 67 may also be provided.

Figure 31:
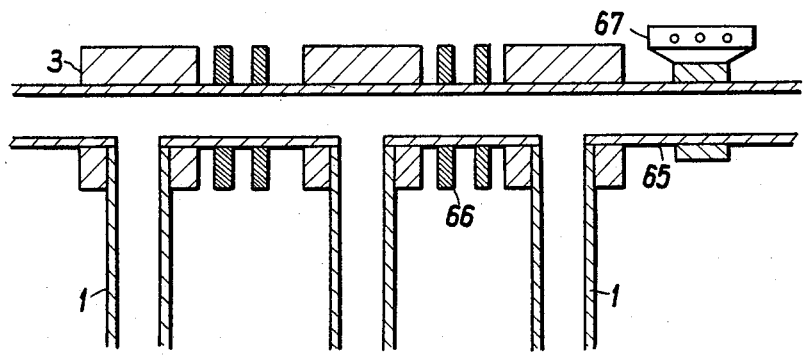
FIGURE 31 is a vertical section through a tubular support and heating components supported thereby.
Figure 32:
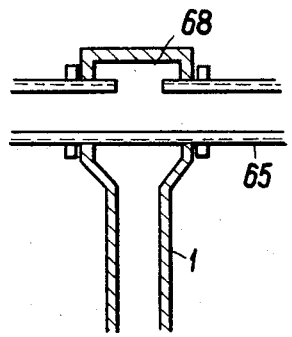
FIGURE 32 is a vertical section through an externally-threaded tubular support and heating component supported thereby.
Figure 33:
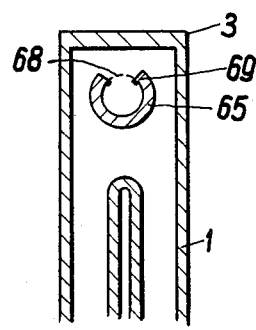
FIGURE 33 is a vertical section through the arrangement shown in FIGURE 32 taken perpendicular to that figure.

While according to FIGURE 31 the external and internal wall surfaces of the tubular support 65 are smooth, this wall, in FIGURE 32, is externally threaded so that heating components may be screwed to any desired position along the tube and secured in position by lock nuts or the like. A connecting opening 68 for flow of heating fluid from the tubular support 65 into each of the heating tubes 1 is provided on the upper side of support 65. The heating fluid flows out of the tubular support through such opening 68, around the supporting tube and into the heating tubes 1. The cross section in FIGURE 33 shows reinforcing strips 69 extending lengthwise along edges of openings 68.

Figure 34:
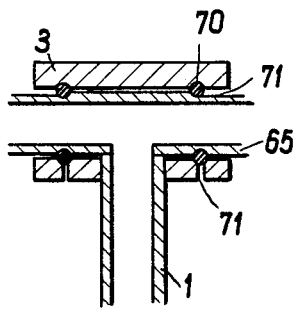
FIGURE 34 is a vertical section through a tubular support and a heating member having packing therebetween.

According to FIGURE 34, annular grooves are made at selected locations in the external wall of the tubular support 65 to receive packing rings 70 or the like. These packing rings engage in corresponding grooves in the headers 3, thereby spacing such headers from the tubular support. Packing material may also be pressed into the annular grooves through circumferential or longitudinal channels 71. According to the example in FIGURE 35 packing rings 72, wedge-shaped in cross section, are provided between the tubular support 65 and the header, which rings, for example, may be securely held by threads while providing a satisfactory seal.

The examples according to FIGURE 35 show how the heating members may be located on a tubular support without having to be installed and removed from the end of the tube. It has been shown many times in practice that it would be desirable to be able to add more heating components after installation of a heating system without having to disassemble all the sections and put the system out of commission for a long time. According to the invention, such a subsequent addition to the system can be effected very easily by forming the heating components in two or more parts and engaging them over the supporting tube from opposite sides. In such instances the heating component may be made of two parts 73 and 74 cooperating to form a continuous heating element serving as both the header and heating tube. However, it is also possible for the heating tubes themselves to be undivided and only the headers to be constructed in two parts.

Figure 35A:
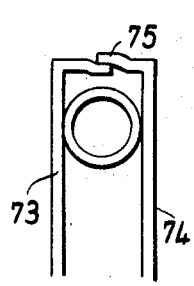
FIGURES 35a, 35b, 35c and 35d are vertical sections of alternate forms of heating components mounted on tubular supports.
Figure 35B:
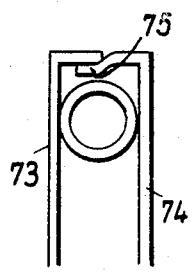
Figure 35C:
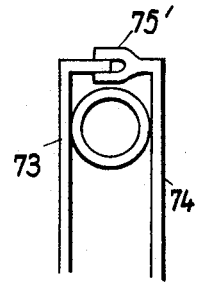
Figure 35D:
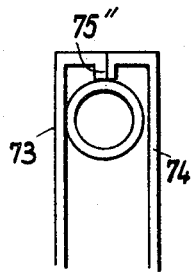

In order to be able to connect the parts of the heating components together securely, lap joints 75 as shown in FIGURES 35a and 35b, or tongue-and-groove joints 75' as in FIGURE 35c, or butt joints 75" as in FIGURE 35d may be formed by edge portions and sealingly bonded when the components are in place. While the examples according to FIGURES 35a and 35b have the advantage that both parts of the components are similar and therefore can be made from the same mould or die, the best type of seal is achieved with a tongue-and-groove joint as shown, for example, in FIGURE 35c.

Figure 36:
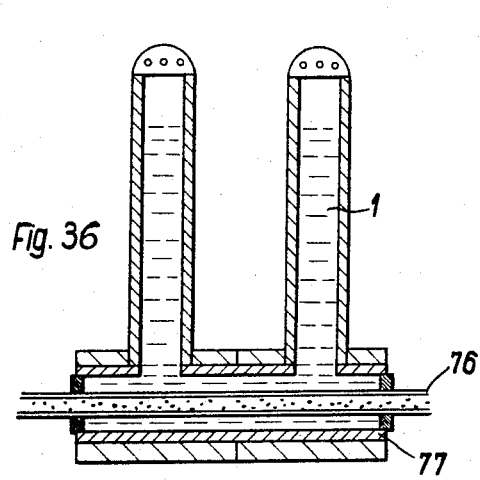
FIGURE 36 is a vertical section through a heating component having two coaxial tubes.

With the aid of a tubular support, which also conducts the heating fluid and on which the heating components are mounted, it is possible to isolate the circulating fluid from that flowing in the heating component itself. FIGURE 36 shows an embodiment in which two coaxial tubes 76 and 77 are provided. The internal tube 76, for example, need be only a copper tube of small diameter. This tube conducts the flowing heating fluid and heat is exchanged with the fluid in the outer tube circulating only locally within the individual heating component 1.

Figure 37:
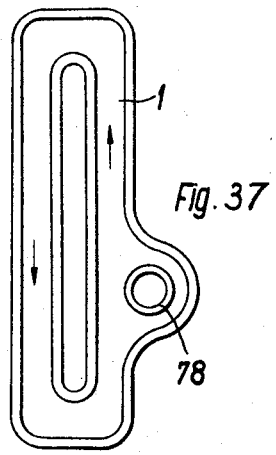
FIGURE 37 is a vertical section through a heating component with the tubular support displaced laterally with respect to the central axis of the component.

As FIGURE 37 shows, the supporting tube 78 may be located in the lower portion of one leg of a heating component providing a closed path for circulation of heating fluid. This has the advantage of providing a closed loop for convection circulation of the local body of heating fluid within each heating component.

Since there is no pressure in the fluid in the heating components where such fluid is heated indirectely by heat transfer as illustrated in FIGURES 36 and 37, it would, for example, also be possible for the tops of the heating tubes to be open or to provide them with a removable or adjustable cover, so that the medium located in the individual heating components can evaporate and consequently humidify the ambient atmosphere, if desired.

Figure 38:
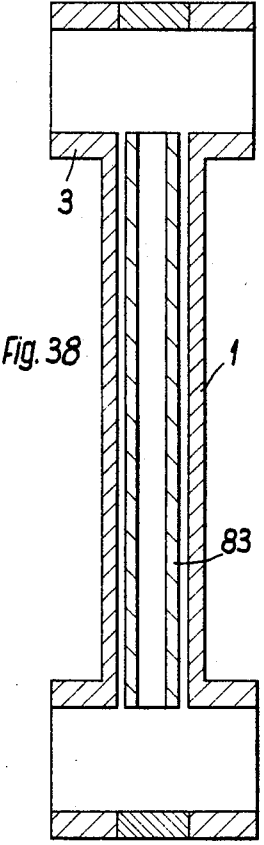
FIGURE 38 is a vertical section through a heating member having means for changing the volume of heating fluid flowing therethrough.

In order to be able to alter or divide the internal space of the heating fluid passages, hollow fillers 83 shown in FIGURE 38, spirals, dividing walls, bars, cords or the like may be inserted.

Figure 39:
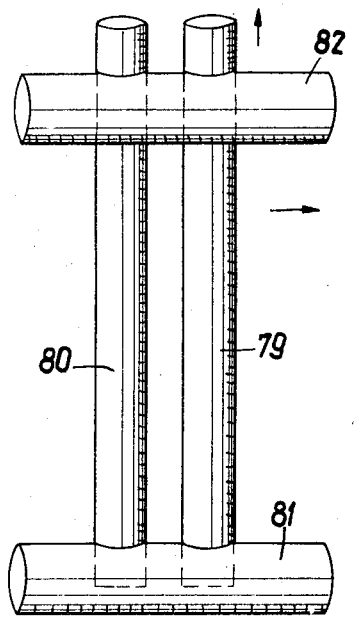
FIGURE 39 is an elevation of a portion of a mould for a heating component.

The heating members of the above-mentioned embodiments may be moulded by a casting process, or made of formable material by a pressing or blowing process, or may be made by any other suitable process. During production by casting or pressing, a core is laid in the mould, as may be seen for example in FIGURE 39. In order later to beable to remove the cores inserted in the heating tubes, if such cores cannot be melted out as mentioned above, mould openings are provided in the header. The moulded core is, for example, constructed of several parts, the vertical core parts 79 and 80 being inserted in the lower horizontal core part 81 and passing through the upper core part 82, corresponding openings being provided in such horizontal core parts. After the moulded body has hardened, the core parts 79 and 80 are pulled in the direction of the vertical arrow in FIGURE 39 and subsequently the molded parts 81 and 82 are removed from the side, as indicated by the horizontal arrow.

However, the heating components according to the invention may also be blown by inserting air under pressure into the material and inflating, for example, hollow bodies which may later be deflated and pulled out, such inflated bodies constituting a mould core. Either of these methods of manufacture will provide smooth internal walls so that no subsequent finishing is required. By using a flexible material, such as plastic, the heating component will not crack and is frost-resistant.

I claim:
1. A heating unit comprising a plurality of heating components, each component being a unitary molded seamless structure of plastic material and including an upper header, a lower header and elongated connecting tube means spanning between and connecting said upper and lower headers, each header having a passage (7) extending therethrough transversely of the length of said tube means and communicating with said tube means, one end portion of said passage having a boss (9) and the other end portion of said passage having a recess (10) complemental to said boss for fitting like recesses and bosses, respectively, of header passages in adjacent heating components, each header further having an opening (11) in a side thereof communicating with a side of said passage.

2. A heating unit comprising a plurality of heating components, each component being a unitary molded seamless structure of plastic material and including an upper header, a lower header and elongated connecting tube means spanning between and connecting said upper and lower headers, each header having crossing passages (7, 11) extending therethrough transversely of the length of said tube means and communicating with said tube means, one end portion of one of said passages having a boss (9) and the other end portion of said one passage having a recess (10) complemental to said boss for fitting like recesses and bosses, respectively, of header passages in adjacent heating components.

3. A heating unit comprising a plurality of heating components, each component being a unitary molded structure of plastic material including an upper header, a lower header and elongated connecting tube means spanning between and connecting said upper and lower headers, each header having a passage (7) extending therethrough transversely of the length of said tube means and communicating with said tube means, one end portion of said passage having a boss (9) and the other end portion of said passage having a recess (10) complemental to said boss for fitting like recesses and bosses, respectively, of header passages in adjacent heating components, and one of said headers having an opening (12) in the side thereof opposite said connecting tube means coaxial with the hollow of said connecting tube means of a cross-sectional size at least as great as the internal cross section of said connecting tube means and communicating with said passage.

References Cited

UNITED STATES PATENTS

| | | | |
|---|---|---|---|
| 3,239,000 | 3/1966 | Meagher | 165—46 |
| 1,730,472 | 10/1929 | Murray | 25—128 X |
| 2,064,935 | 12/1936 | McFall et al. | 251—138 |
| 2,752,125 | 6/1956 | Modine | 165—130 |
| 2,992,545 | 7/1961 | Walker | 165—170 X |
| 3,214,505 | 10/1965 | Pierkowski et al. | 18—45 X |
| 609,800 | 8/1898 | Fowler | 165—130 |
| 1,962,837 | 6/1934 | Raible | 165—130 |
| 2,037,269 | 4/1936 | Rieser | 264—319 |
| 2,343,387 | 3/1944 | Sargent et al. | 165—130 |
| 2,565,248 | 8/1951 | Lyjijnen | 264—319 |
| 3,104,701 | 9/1963 | Jacoby | 165—148 |
| 3,153,447 | 10/1964 | Yoder et al. | 165—170 |
| 2,068,236 | 1/1937 | Kuenstler | 165—168 X |

ROBERT A. O'LEARY, *Primary Examiner.*

T. W. STREULE, *Assistant Examiner.*